Feb. 24, 1942.    C. G. MUENCH    2,274,495
PROCESS OF THE MANUFACTURE OF INSULATING UNITS
Filed Jan. 10, 1938    4 Sheets-Sheet 1
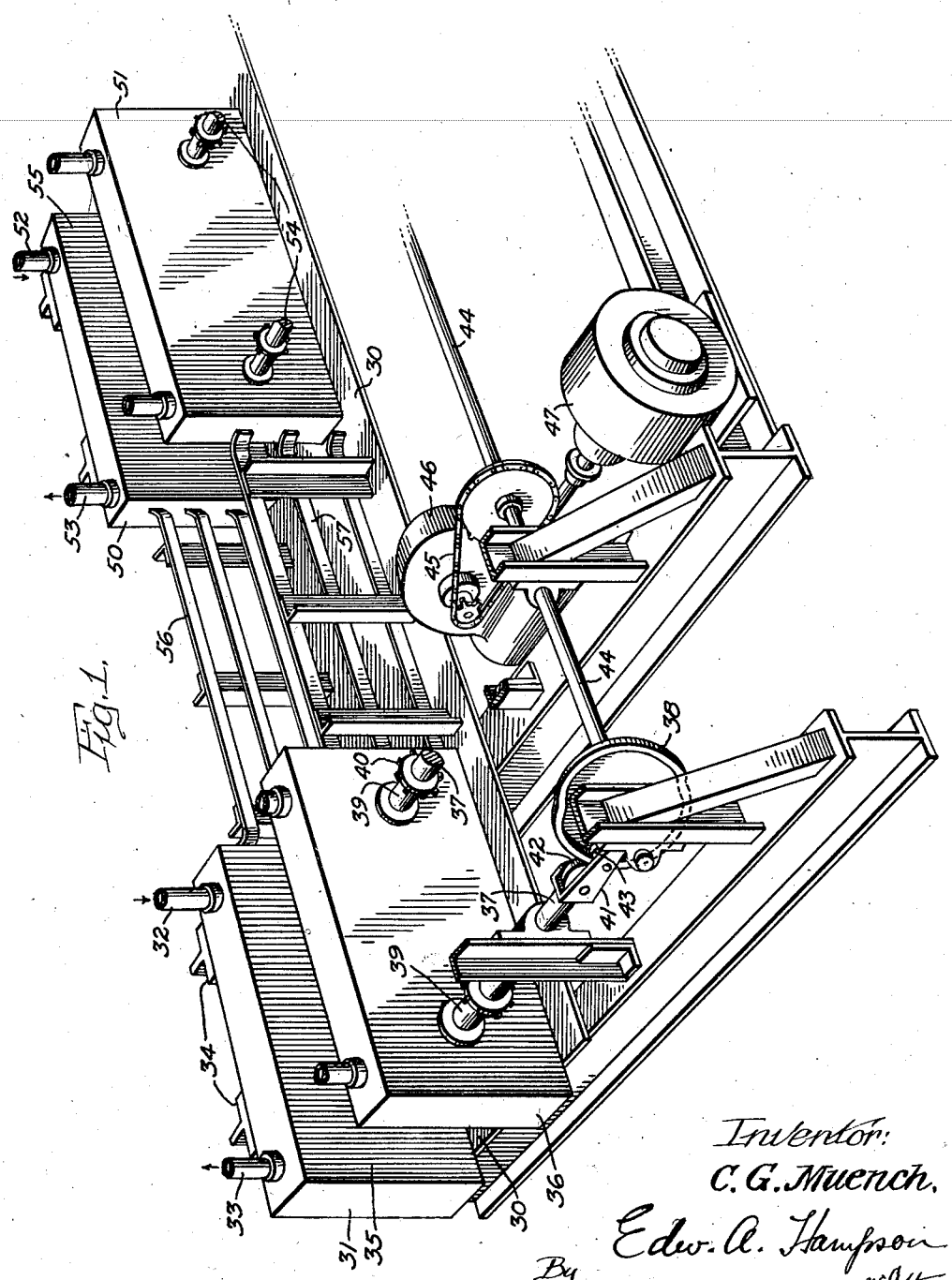
Inventor:
C. G. Muench.
By Edw. A. Hampson
Atty.

Feb. 24, 1942.        C. G. MUENCH        2,274,495
PROCESS OF THE MANUFACTURE OF INSULATING UNITS
Filed Jan. 10, 1938        4 Sheets-Sheet 2
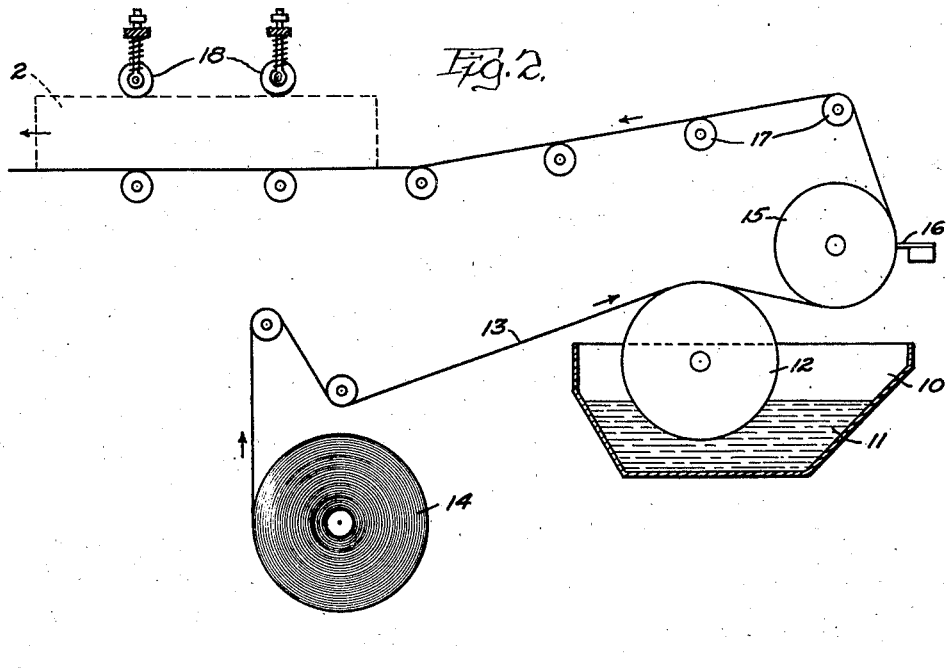
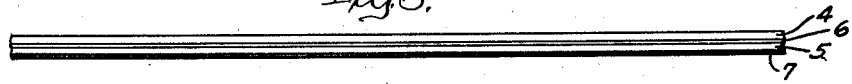
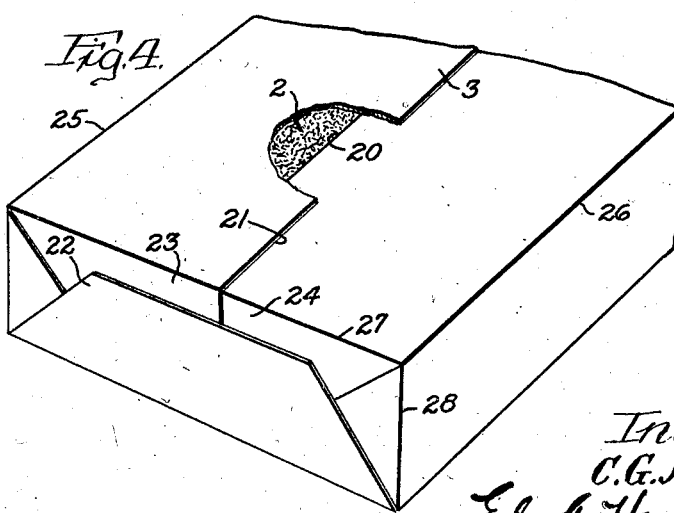

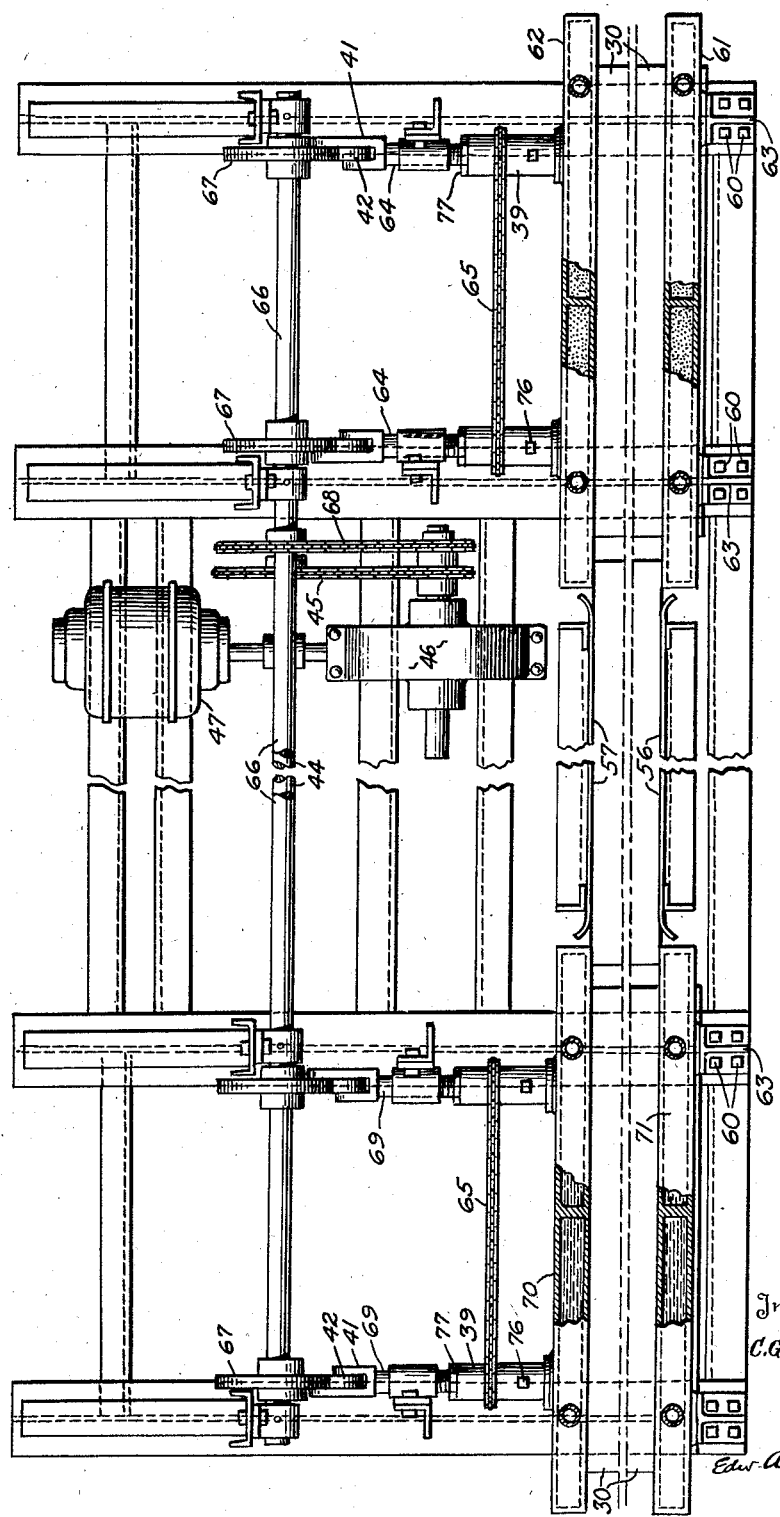

Feb. 24, 1942. C. G. MUENCH 2,274,495
PROCESS OF THE MANUFACTURE OF INSULATING UNITS
Filed Jan. 10, 1938 4 Sheets-Sheet 4
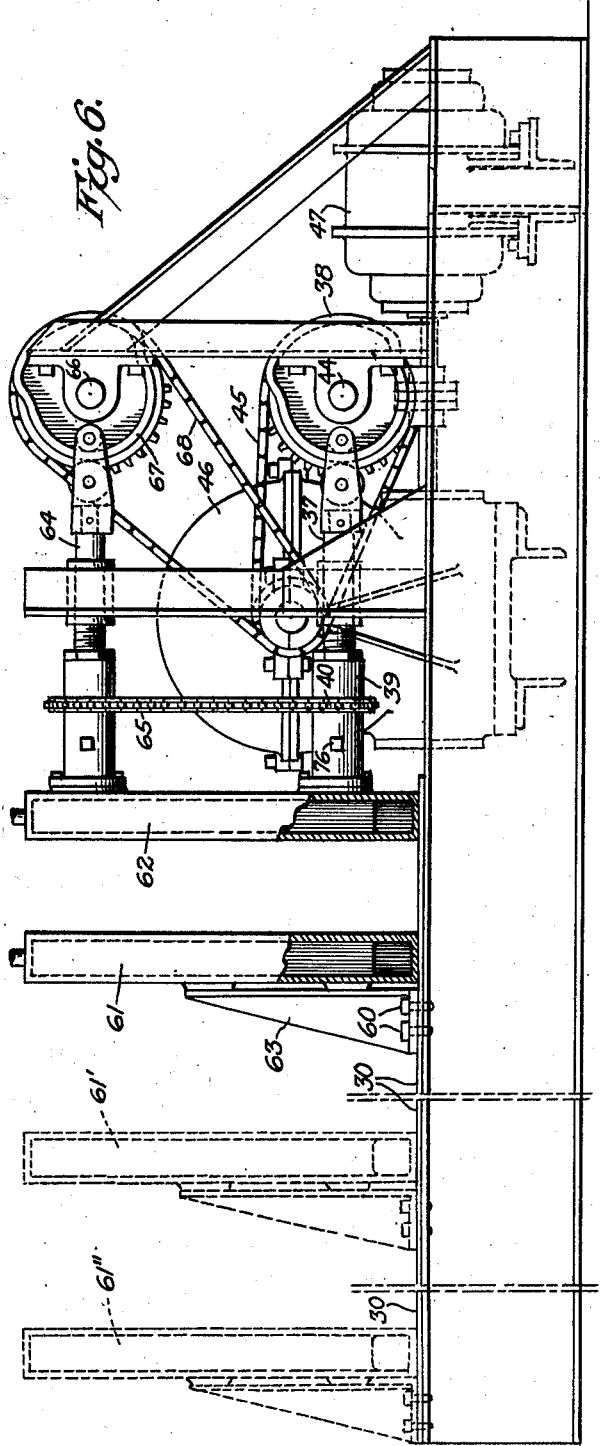
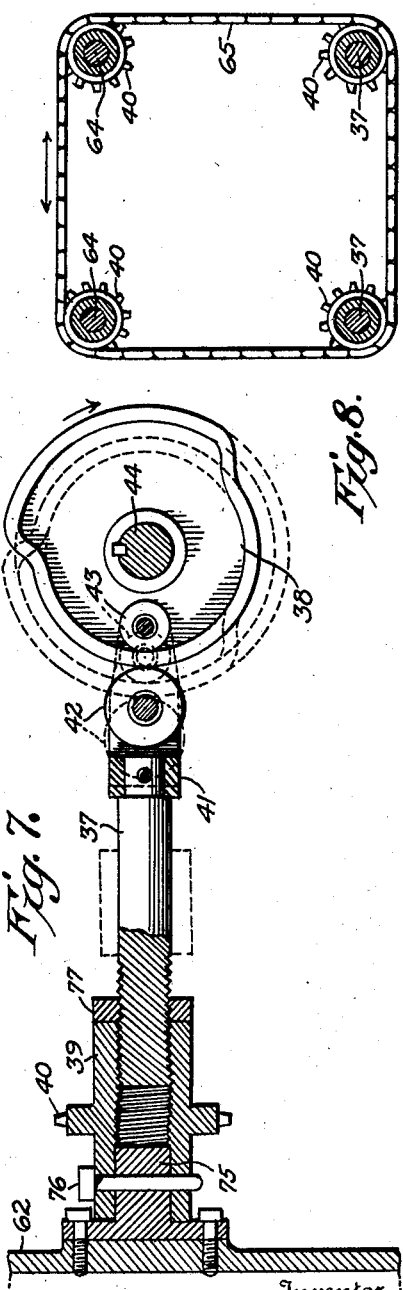
Inventor,
C. G. Muench,
Edw. A. Hampson
Attorney Patented Feb. 24, 1942

2,274,495

UNITED STATES PATENT OFFICE 2,274,495

PROCESS OF THE MANUFACTURE OF INSULATING UNITS

Carl G. Muench, New Orleans, La., assignor to The Celotex Corporation, Chicago, Ill., a corporation of Delaware Application January 10, 1938, Serial No. 184,229

14 Claims. (Cl. 154—28)

This invention relates to building units and more particularly to such units as will insulate against heat and/or cold, said invention having for its object to provide a method of, as well as an apparatus for, producing such a building unit and which will be less costly to carry out and more efficient in operation than those heretofore proposed, the invention further contemplating the production of a building unit of novel characteristics.

With these and other objects in view the invention resides in the novel details of construction and combinations of parts constituting the apparatus and the product, as well as in the novel steps and combinations of steps constituting the method of producing the building unit, all as will be disclosed more fully hereinafter and particularly pointed out in the claims.

Referring to the accompanying drawings forming a part of this specification and in which like numerals designate like parts in all the views—

Fig. 1 is a partial perspective view illustrating one form of the apparatus used in the production of the building unit;

Fig. 2 is a diagram illustrating a method of treating the paper wrapper preparatory to forming the building unit;

Fig. 3 is an edge elevation (enlarged) of a portion of a wrapper found suitable in the formation of the building unit;

Fig. 4 is a partial perspective view of a finished building unit with portions broken away to better illustrate the construction;

Fig. 5 is a top plan view of another form of apparatus found suitable in the production of the building unit;

Fig. 6 is an end elevational view of the apparatus shown in Fig. 5;

Fig. 7 is a detail view partly in elevation and partly in section illustrating the mechanism for moving one of the platens used in the apparatus; and Fig. 8 is a detail view partly in section and partly in elevation illustrating the synchronization of the means for adjusting the movement of one of the platens of the apparatus.

This invention is particularly adapted to the formation of a building unit well suited to prevent the passage of heat and/or cold therethrough, such a unit having utility in the formation of a wall, or wall lining, of a cold storage room or the like, and wherein a plurality of such units are laid somewhat in the manner of brickwork. To this end there is provided a substantially rectangular block 2 of suitable insulating material such as cork, compressed sawdust or excelsior, or some vegetable fibrous material, it having been found in practice that bagasse forms an excellent material for this purpose. This block or mass of insulating material is provided in suitable sizes that can be easily handled and which will provide a fairly rapid erection of the wall or the lining thereof, and it is contemplated that such blocks may have dimensions of as much as 36" x 18" x 2" and/or multiples or fractions thereof so that, when a plurality of the building units are laid in the wall formation, the joints between the units may be staggered or broken. Each block of insulating material is enclosed in a wrapping generally identified by the numeral 3 with the edges of the wrapping overlapped and sealed as indicated in Fig. 4.

The wrapping consists preferably of a sheet of paper or fibrous material which is treated to prevent the passage of moisture therethrough and, whereas in the following description the term "paper" is used, it is to be understood that any other suitable wrapping medium may as well be covered by this term, such as glassine, cellulose acetate sheets, etc. The treatment of the paper may comprise the application to one surface thereof of a coating of moisture repellant substance, or a substance adapted to prevent the passage of moisture therethrough, and for practical purposes it has been found that a coating of asphaltic substance is well suited for this purpose. On the other hand, a laminated wrapping medium may be used consisting, for example, of two sheets of paper such as 4 and 5 adhered together by an asphaltic binder indicated at 6 in Fig. 3. The asphaltic substance selected should be one such that the coating thereof, on or between the paper sheets, will not be brittle at temperatures to which the finished product is subjected, yet one which should be capable of softening and becoming "tacky" when subjected to a temperature of substantially 212° F., and therefore a relatively wide range of asphaltic substances is contemplated though in practice a suitable substance would be one having a melting point range of approximately 120°–180° F. Further, the thickness of the coating of asphaltic substance is capable of considerable latitude though it has been found that a suitable coating is one where 60 lbs. of the substance is used in uniformly covering 100 sq. ft. of paper surface.

Whether a single sheet of paper, or a laminated structure such as shown in Fig. 3, is contemplated for use, the wrapping has applied to one surface thereof a coating of the asphaltic substance as indicated at 7 which coating is intended to contact the surface of the block 2 of insulation. The application of the coating is illustrated in Fig. 2 wherein there is provided a vat 10 containing a supply of melted asphaltic substance 11 into which dips a roller 12 over which the paper 13 is led from a suitable supply such as the roll of paper 14, said paper receiving on its exposed surface a quantity of the asphaltic substance as will be readily understood. From the coating roll 12 the paper passes over another roller 15 mounted above the vat 10 and having associated therewith the doctor blade 16 for scraping off surplus asphaltic substance and thereby controlling the thickness of the coating, the surplus dropping into said vat. From the doctor roll 15 the paper then passes over suitable guide and supporting rolls such as 17 simulating a table, and here a block 2 of the insulating material is laid in correct position upon the coated surface of the paper, the coating still being sticky or unsolidified when the block is placed thereon. The combined block and paper is then passed under pressure rollers such as 18 disposed immediately above fixed guide rollers so that a better bond is created between the surface of the block and the still unsolidified coating on the paper. The paper is cut transversely of the moving sheet of paper to provide the necessary quantity or size for forming the wrapping around the block. Preferably, the block of insulating material is dipped into a vat of melted asphaltic substance to apply a coating thereof over said block before the block is positioned upon the coated paper, this being done primarily to form an adhesive surface thereon.

The wrapping of the block with the coated paper is performed manually or by suitable wrapping machine, the edges such as 20 and 21 of the covering sheet being brought up and over the sides of the block and pressed against the upper surface of said block with said edges overlapped as shown in Figure 4. Then the paper on the other two sides of the block is folded and tucked in, in the usual manner, and the resulting flap 22 pressed against the folded portion of the paper to provide the sealed end shown. This wrapping of the block is in no wise different from the usual wrapping of a rectangular article except that it is to be understood that the paper wrapper has a coating thereon of unsolidified, and therefore tacky, asphaltic substance, said coating being on the side of the paper next to the block of insulating material, and hence it will be possible to establish a cemented condition between the overlapped edge portions 20 and 21 as well as a cemented condition between the flap 22 and the outermost uncoated surface of the paper wrapper where it is tucked down as at 23 and 24 at what may be termed the sealed ends of the completed building unit.

After the block of insulating material has been wrapped, the wrapped package or unit may not have squarely formed edges such as 25, 26, 27 and 28 wherefore some difficulty might be experienced in erecting a plurality of such units in the formation of a wall, and therefore an important feature of this invention is to provide such units with relatively sharp or square edges, as well as opposite parallel flat surfaces, to make the completed building unit as rectangular as possible. To this end the opposite faces of the wrapped unit are successively heated (to slightly soften the asphaltic coating substance) and then cooled (to solidify the substance), both heating and cooling being under slight pressure between flat platens heated and cooled respectively. The unit is subjected to heating between the hot platens for a relatively short period of time sufficient only to soften said substance and not long enough to permit the softened substance to be absorbed into the paper, and then the unit is quickly subjected to the action of similar but cooled platens under pressure. Suitable mechanism for accomplishing this is illustrated in Figures 1, 5, 6, 7, and 8.

Referring first to Fig. 1 there is illustrated a substantially horizontal table 30 upon which is positioned a hollow platen 31 through which steam may be circulated as by the pipes 32 and 33, suitable braces such as the T-bars 34 being provided to prevent movement of the platen in one direction. The vertical face 35 of this platen, opposite to the face contacting the braces 34, is made smooth, and opposed to this platen 31 is a companion hollow platen 36 likewise steam heated and having a smooth vertical face facing the smooth face 35. This second platen 36 is parallel to, and slidable toward and away from its companion relatively stationary platen 31, the movement of the platen 36 being accomplished by a pair of similar push rods such as 37 slidable through suitable bearings and actuated by a pair of identical cams such as 38. One end of each push rod is threaded into a collar member such as 39 carried by the platen, and the extent of this threaded engagement may be varied in any suitable manner as by the turning of a sprocket wheel such as 40 to obtain adjustment of the throw of the platen 36 or rather to vary the separation distance between the two platens when the platen 36 is in the extreme of its movable position. The other end of each push rod carries a yoke such as 41 having attached thereto a pair of rollers such as 42 and 43 adapted to ride respectively on the outer surface and inner surface of the cam 38, said cam being mounted upon the shaft 44 receiving rotation as by the chain and sprocket drive indicated at 45 from a speed reducer generally identified by the numeral 46 deriving power from the electric motor 47. Therefore it will be understood that the two push rods 37 are identical in construction and arrangement and that they are actuated by identical cams such as 38 wherefore there will be equal movement of both ends of the movable platen 36 resulting in substantially constant parallelism between the opposing smooth faces of the platens 31 and 36.

Spaced from the steam heated pair of platens just described, but aligned therewith on the table 30, is a second pair of parallelly arranged similar hollow platens indicated by the numerals 50 and 51, the former being relatively stationary, but the latter movable toward and away therefrom, each platen being cooled by circulating water as through the pipes 52 and 53. The movable platen 51 is actuated by a pair of push rods such as 54 which are duplicates of, and which operate in exactly the same manner as, the push rods 37 previously described, for this purpose the shaft 44 being extended and carrying a pair of cams which are duplicates of the cams 38 previously described, these operating connections not being shown in Fig. 1 not only for the sake of clearness but because they will be readily understood without repetitious showing. The cool platen 50 has its smooth face 55 in substantially the same plane with the corresponding face of the hot platen 31 and therefore it will be seen that the wrapped building unit, after being heated, can be slid over the surface of the table 30 to correct position between the platens 50 and 51 for cooling and compression thereby, fences 56 and 57 being provided for guiding purposes between the hot pair and the cold pair of platens.

A wrapped unit when placed between the pair of hot platens will be operated upon when the platen 36 is moved by an actuating cam 38, the spacing between said platens being such that the movable platen will compress slightly the wrapped unit during one movement of its throw, and this compression will be maintained (due to the shape of the cam) only for a period of time sufficient to soften the asphaltic coating 7 of the wrapping. In other words it is not desired particularly to soften the cementing asphaltic substance 6 in a laminated paper wrapper since to do so would very probably result in permeation of the paper layers by said substance, and therefore in practice it has been found desirable, with a laminated wrapper, to provide an asphaltic substance for the cementing layer 6 which has a higher melting point than that of the asphaltic coating 7, and consequently melting points respectively of 185° and 140° are found very suitable when using 220° F. steam at 5-6 lbs. per square inch. It is not desired to be limited to these specific melting points and temperature because others can as well be used, and the hot platens may be heated by other means than steam, such as electrical heating coils, but it is a fact that, for successful operation, the factors of melting points, platen temperatures, and duration of compression by the platens, should be taken into consideration, and therefore considerable latitude in their relations is contemplated herein. With the practical and suitable melting points and temperature above mentioned, it has been found that the cams 38 may be so formed as to have a fifteen second cycle during which the compression of the platens is maintained for five seconds. It may be found advisable to construct the cam to provide a release of this compression which will operate faster than the application of the compression, so that the heated unit can in turn be more quickly slid away from the hot platen to prevent an overheating of the asphaltic substance.

Upon the retraction of the movable hot platen 36 by cam action, the heated wrapped unit is quickly slid to position between the pair of cool platens 50 and 51 for similar compression for substantially a similar period of time, or for a time sufficient to chill the softened asphaltic substance to solidification. For practical purposes the temperature of the cooling water may be in the range of 70°-90° F. though water as it comes from the city mains will suffice. During this cooling compression the paper wrapper will be pressed and/or smoothed; that is to say, the action of the cool platens may be compared with "ironing" the unit and solidifying the asphaltic substance to create two paper surfaces of the unit that are substantially parallel.

The heating portion of the cycle softens the asphaltic coating previously described as applied to the surface of the block of insulating material and also softens the film 7 applied to the back of the wrapper. When the softened films are pressed into firm contact during the cooling portion of the cycle, the contacting adhesive layers referred to are adhered firmly one to the other to securely adhere the wrapper to the surfaces of the insulating material core.

In the foregoing description it will be understood that the pair of hot platens and the pair of cool platens will have operated upon the same pair of opposed surfaces of the unit, and therefore those surfaces which define one dimension of the unit, wherefore it then becomes necessary to operate upon those surfaces which define the other two dimensions thereof.

The unit is subjected to repetitions of alternate heating and cooling between pairs of platens which are identical to the set of platens just previously described, the only difference being that the second set of heating and cooling platens may be of different area and will have their movable members so spaced from their stationary members as to operate upon the pair of opposite surfaces defining the second dimension of the unit, and the third set of heating and cooling platens may be of still different area and will have their movable and stationary members so spaced apart as to operate upon the remaining pair of opposite surfaces defining the third dimension of the unit. In other words, for a unit having a length and a breadth which are different from each other as well as different from its thickness, there will be three sets of platens having corresponding areas and separation distances, each set comprising a pair of heating platens and a pair of cooling platens. However, if the unit has two dimensions which are equal, it is obvious that one set of platens may serve double duty.

The heating platens of each set will not affect the solidification of asphaltic substance caused by the cooling platens of any preceding set because the surfaces of the unit already solidified will not come in contact with the surfaces of succeeding heating platens, and hence, after passing through the third set of platens, the building unit will be rectangular in shape having parallel opposite faces which are relatively smooth and having substantially square edges. Even if some wrinkles are formed in the paper wrapper on any one side of the unit by action of the platens, these wrinkles will be small and will not cause any defect in the building of the wall with the units, because asphaltic or other surfacing substance or composition is usually painted or troweled upon the surface of the finished units, at the time that they are laid in the wall formation, to cement the plurality of units together and/or to the established wall surface when said units are applied as a lining thereof, and hence the asphaltic composition or other cement will fill such wrinkles and prevent passage of air, as will be readily understood.

In Figures 5 to 8 there is disclosed a modification of the construction hereinbefore described wherein only one set of platens is utilized due to the fact that one of the heating platens, as well as one of the cooling platens, may be adjusted to different positions upon the table of the apparatus in accordance with the particular dimension of the unit being operated upon. That is to say, there is provided the table 30 provided with a plurality of holes adapted to receive studs such as 60 for securing a hot platen 61 to the table in a vertical position according to the dimension of the unit. In other words, referring to Figure 6, the platen 61 is shown in full lines spaced from its companion platen 62 a distance corresponding to one dimension of the unit, and it is shown in dotted lines at 61' spaced from said companion platen a distance corresponding to the second dimension of the unit, and it is shown again in dotted lines at 61'' spaced from the platen 62 according to the third dimension of the unit, the dot and dash lines through the table being for the purpose of representing broken-out portions for the purpose of foreshortening the overall dimension of the entire apparatus, as customary; the platen 61 is secured to suitable braces such as 63 through the base of which the studs 60 are passed.

The companion platen 62 is a substantial duplicate of the hot platen 36 previously described except that it is indicated as of considerable larger surface area in order to accommodate a unit of appreciable size, and whereas the platen 36 was shown as actuated by only a pair of push rods such as 37, the platen 62 because of its size is actuated by two pairs of push rods, the lower pair being indicated in Fig. 6 by the numeral 37 and the upper pair indicated by the numeral 64, but it is to be understood that all four push rods are identical and have their sprockets such as 40 in a common transverse plane and interconnected by a single sprocket chain 65, see Fig. 8, this serving as a practical means for accomplishing simultaneous movement of all sprockets for uniform adjustment of the separation distance between the platens 61 and 62, said chain being movable in either direction as indicated by the double headed arrow.

Because of the two pairs of push rods, there must of necessity be a plurality of duplicate cams such as 38 previously described and mounted upon the shaft such as 44, and consequently a second shaft 66 is provided which is a duplicate of, and positioned over, the shaft 44, and this shaft 66 carries two identical cams 67 which are duplicates of the cams 38, all of said cams actuating their respective push rods through the provision of a yoke on each push rod having the rollers such as 42 and 43 previously described and contacting respectively the outer surface and the inner surface of each cam, see Fig. 7. The four cams of each set will be identically positioned upon the shafts 44 and 66 so as to synchronize the action of the four push rods and thus maintain parallelism between the platens 61 and 62. The shaft 66 is driven as by the chain and sprocket connection indicated at 68 from the speed reducer 46 in turn receiving power from the electric motor 47.

Both shafts 44 and 66 are extended to have mounted thereon duplications of the cams 38 and 67 which cams however will operate four other push rods such as indicated at 69 for moving a platen 70 which is identical with the hot platen 62 except that it receives cooling water therethrough instead of steam, and this cool platen 70 has a companion platen 71 likewise cooled by water which is capable of being adjusted to establish a separation distance with respect to the platen 70 in accordance with the dimension of the unit to be operated upon. In other words the pair of cool platens 70 and 71 are substantial duplicates of the hot platens 62 and 61 respectively as to construction and operation, and the actuation and adjustment of the cool platen 70 is identical with the actuation and adjustment of the hot platen 62 and therefore it is believed that no further description is necessary in connection with this cooling pair of platens.

In Fig. 7 is shown in detail a means of adjusting the throw of a hot platen such as 62. The platen carries a hub 75 in alignment with the push rod 37 and on this hub is pinned as at 76 one end of the collar 39 carrying the adjusting sprocket 40, said collar being tubular and internally threaded to receive the threaded end of said push rod, the lock nut 77 being provided for jamming action against the end of the collar when the correct adjustment has been made. The only reason for providing this adjustment is to vary the compression of the unit between the platens although obviously the length of the threaded engagement between the push rod and its collar may be made sufficient to permit a substantial lengthening or shortening of the distance between the cam roller 42 and the platen 62 so that adjustment can be made corresponding to differences in lineal dimension of a unit. By removing the pin 76, the collar 39 can be rotated by movement of its sprocket to gain or lose threaded engagement with the push rod, the lock nut 77 having first been released, and then the collar can be repinned to the hub 75 and the lock nut jammed against the collar, the main purpose of the lock nut being to secure the push rod and collar together so that no pinch or jamming action will result between the cam surfaces and the cam rollers.

It is obvious that those skilled in the art may vary the details of construction and arrangements of parts constituting the apparatus and product of this invention, as well as vary the steps of the method by which the product is produced, without departing from the spirit of this invention, and therefore it is desired not to be limited to the exact foregoing disclosures except as may be required by the claims.

What is claimed is:

1. The method of preparing a building unit comprising a wrapper of paper and a rigid unit mass of structural insulation material which comprises coating a sheet of paper with a melted bituminous substance; applying the paper as a wrapper about the rigid unit mass of structural insulating material; and shaping the completely wrapped unit in a series of steps causing the faces and edges of the wrapped unit to be smoothly affixed.

2. The method of preparing a building unit comprising a wrapper of paper and a rigid unit mass of structural insulation material which comprises coating a sheet of paper with a melted bituminous substance; applying the paper as a wrapper about the rigid unit mass of structural insulating material while the coating is tacky; and shaping the completely wrapped unit in a series of steps, each step comprising heating the wrapper causing the bituminous substance to soften and pressing and cooling the wrapper whereby opposite faces and edges of the wrapped unit are smoothly affixed.

3. The method of preparing a building unit comprising a wrapper of paper and a rigid unit mass of structural insulation material which comprises coating a sheet of paper with a melted bituminous substance; applying the paper as a wrapper about the rigid unit mass of structural insulating material; and shaping the completely wrapped unit by first softening the coating substance and then solidifying the softened substance while holding the completely wrapped unit under compression.

4. The method of preparing a completely wrapped building unit comprising a wrapper of paper and a rigid unit mass of structural insulating material which comprises coating a sheet of paper with a melted bituminous substance; applying the paper as a wrapper about the rigid unit mass of structural insulating material; subjecting the completely wrapped unit to heat to soften the coating substance; and shaping the completely wrapped unit under applied pressure before the softened substance solidifies.

5. The method of preparing a completely wrapped building unit comprising a wrapper of paper and a rigid unit mass of insulation material which comprises coating a sheet of paper with a melted bituminous substance; applying the paper as a wrapper about the rigid unit mass of structural insulating material and utilizing the unsolidified substance to cement the paper to the material as well as to seal the wrapper; and subsequently shaping the completely wrapped unit by first softening the coating substance and then solidifying the softened substance while holding the unit under compression.

6. The method of preparing a building unit which comprises coating a sheet of paper with a melted bituminous substance; applying the paper as a complete wrapper about a unit mass of insulating material and utilizing the unsolidified substance to cement the paper to the material as well as to seal the wrapper; subsequently subjecting the completely wrapped unit to heat to soften the coating substance; and before the softened substance solidifies, subjecting the completely wrapped unit to applied pressure with attendant cooling temperature to shape the unit.

7. The method of preparing a building unit which comprises coating a sheet of laminated paper with a bituminous substance having a melting point below that of the laminating adhesive; applying the paper as a complete wrapper about a unit mass of insulating material; subjecting the opposite faces of the completely wrapped unit to heat sufficient to soften the coating substance but insufficient to cause the laminating adhesive to impregnate the paper layers; and before the softened substance solidifies, subjecting the aforesaid faces of the completely wrapped unit to applied pressure with attendant cooling temperature to shape the unit.

8. Apparatus for forming a building unit comprising means for coating one surface of a sheet of paper; means for conveying the coated paper to a position where it is applied as a complete wrapper about a unit mass of insulating material; means for simultaneously heating the entire surface of the opposite faces of the completely wrapped unit to soften the coating on the paper; and means for shaping the completely wrapped unit under applied pressure before the softened substance solidifies.

9. Apparatus for forming a building unit comprising means for coating one surface of a sheet of paper; means for conveying the coated paper to a position where it is applied as a complete wrapper about a unit mass of insulating material; platen means for simultaneously heating the entire surface of opposed faces of the completely wrapped unit to soften the coating on the paper; and platen means for shaping the aforesaid faces of the completely wrapped unit under applied pressure before the softened substance solidifies, both of said platen means actuated by a common operating member.

10. Apparatus for forming a building unit comprising means for coating one surface of a sheet of paper; means for conveying the coated paper to a position where it is applied as a wrapper about a unit mass of insulating material; means for heating the wrapped unit to soften the coating on the paper, said heating means comprising a pair of heated platens, one platen movable with respect to the other; and means for shaping the wrapped unit under applied pressure before the softened substance solidifies, said shaping means comprising a pair of cooled platens, one platen movable with respect to the other, the movable platen of the heating means operatively connected to the movable platen of the shaping means by a common actuating member.

11. Apparatus for forming a building unit comprising means for coating one surface of a sheet of paper; means for conveying the coated paper to a position where it is applied as a complete wrapper about a unit mass of insulating material; means for simultaneously heating the entire surface of opposite faces of the completely wrapped unit to soften the coating on the paper; means for shaping the aforesaid faces of the completely wrapped unit under applied pressure before the softened substance solidifies, said shaping means comprising a pair of cooled platens, one platen movable with respect to the other; and means for moving the movable platens toward and away from their companion platens, said moving means comprising cam actuated connections between a single operating shaft and each movable platen.

12. Apparatus for forming a building unit comprising means for coating one surface of a sheet of paper; means for conveying the coated paper to a position where it is applied as a complete wrapper about a unit mass of insulating material; means for simultaneously heating the entire surface of opposite faces of the completely wrapped unit to soften the coating on the paper; means for shaping the aforesaid faces of the completely wrapped unit under applied pressure before the softened substance solidifies, said shaping means comprising a pair of cooled platens, one platen movable with respect to the other; means for moving the movable platens toward and away from their companion platens, said moving means interconnected by a common actuating member; and means for varying the separation distance between a movable platen and its companion platen.

13. The method of preparing a building unit which comprises coating a sheet of laminated paper with a thermoplastic adhesive having a melting point below that of the paper laminating adhesive and coating the surfaces of a unit mass of insulating material with a like thermoplastic adhesive; applying the paper as a wrapper about the coated unit mass of insulating material with the adhesive coated surfaces thereof in face to face relation; subjecting the wrapped unit to heat sufficient to soften the respective thermoplastic adhesive coating substances but insufficient to cause the laminating adhesive to be absorbed by the paper layers and before the softened substance solidifies subjecting the wrapped unit to applied pressure to shape the unit, at the same time subjecting the said wrapped unit to cooling temperature.

14. Apparatus for forming a building unit comprising means for coating one surface of a sheet of paper; means for coating the surface of a rigid unit mass of structural insulating material with a thermoplastic adhesive; means for conveying the coated paper to a position where it is applied as a complete wrapper about the coated unit mass of insulating material, the adhesive coated surfaces being in face to face relation; means for simultaneously heating the entire surface of opposite faces of the completely wrapped unit to soften the adhesive coatings; means for simultaneously shaping the entire surface of opposite faces of the completely wrapped unit under applied pressure before the softened adhesive coatings solidify, said shaping means comprising a pair of cooled platens, one platen movable with respect to the other and means for moving the movable platens toward and away from their companion platens.

CARL G. MUENCH.